United States Patent

Marecki et al.

[11] Patent Number: 5,948,488
[45] Date of Patent: Sep. 7, 1999

[54] GLITTERING CUBE-CORNER ARTICLE

[75] Inventors: Paul E. Marecki, May Township; Jeanine M. Shusta, Mahtomedi; Matthew R. Atkinson, Cottage Grove; Cheryl M. Frey, White Bear Lake; Olester Benson, Jr., Woodbury, all of Minn.

[73] Assignee: 3M Innovative Properties Company, St. Paul, Minn.

[21] Appl. No.: 08/641,451

[22] Filed: Apr. 30, 1996

[51] Int. Cl.⁶ .................................................. B32B 3/30
[52] U.S. Cl. .......................... 428/30; 264/1.1; 428/156
[58] Field of Search .................... 428/4, 30, 156; 264/1.1; 2/244

[56] References Cited

U.S. PATENT DOCUMENTS

| Re. 29,396 | 9/1977 | Heenan | 204/281 |
|---|---|---|---|
| D. 366,365 | 1/1996 | Hoopman | D5/4 |
| 3,010,845 | 11/1961 | Schornstheimer | 427/404 |
| 3,469,898 | 9/1969 | Altman | 359/530 |
| 3,541,606 | 11/1970 | Heenan et al. | 359/533 |
| 3,632,695 | 1/1972 | Howell | 264/2.5 |
| 3,684,348 | 8/1972 | Rowland | 428/29 X |
| 3,689,346 | 9/1972 | Rowland | 156/245 |
| 3,692,731 | 9/1972 | McAdow | 523/204 |
| 3,697,070 | 10/1972 | McAdow | 106/404 X |
| 3,873,184 | 3/1975 | Heenan | 359/533 |
| 3,923,378 | 12/1975 | Heenan | 359/530 |
| 3,926,402 | 12/1975 | Heenan | 249/117 X |
| 3,987,229 | 10/1976 | Rairdon et al. | 428/148 |
| 3,988,494 | 10/1976 | McAdow | 428/328 |
| 4,025,159 | 5/1977 | McGrath | 156/272.2 |
| 4,066,331 | 1/1978 | Lindner | 359/514 |
| 4,189,209 | 2/1980 | Heasley | 359/530 |
| 4,202,600 | 5/1980 | Burke et al. | 359/514 |
| 4,303,305 | 12/1981 | Jones | 359/533 |
| 4,349,598 | 9/1982 | White | 428/161 |
| 4,588,258 | 5/1986 | Hoopman | 359/530 |

(List continued on next page.)

FOREIGN PATENT DOCUMENTS

| 0 269 329 A3 | 6/1988 | European Pat. Off. | G02B 5/122 |
|---|---|---|---|
| 0 342 958 A2 | 11/1989 | European Pat. Off. | |
| 3-124754 | 5/1991 | Japan | C08L 33/12 |
| 5-209142 | 8/1993 | Japan | |
| 1516686 | 7/1978 | United Kingdom | |
| WO 95/11464 | 4/1995 | WIPO | G02B 5/124 |
| WO 95/11471 | 4/1995 | WIPO | |
| WO 95/33612 | 12/1995 | WIPO | B29C 33/40 |
| WO 96/10197 | 4/1996 | WIPO | G02B 5/124 |
| WO 96/36480 | 11/1996 | WIPO | B29D 11/00 |

OTHER PUBLICATIONS

3M Information Folder 1.1 "Scotchlite™ Heat–Lamp Vacuum Applicator", May 1992, (75–0299–8918–5 PRF 223).

3M Information Folder 1.2 "Application of Scotchlite™ Reflective Sheeting High Intensity Grade", Aug. 1992, (75–0299–8919–3).

Japanese Patent Abstract for Publication No. JP6087169.

*Primary Examiner*—Henry F. Epstein
*Attorney, Agent, or Firm*—Karl G. Hanson; Stephen C. Jenson

[57] ABSTRACT

A glittering non-retroreflective sheeting 60 includes an array of cube-corner elements 30 that are arranged in the array such that the sheeting glitters when light is incident thereon. The glitter is in the form of many discrete points of light 68 that tend to blink off and on. The array may be configured such that a dihedral angle α varies between adjacent cube faces 31 of adjacent cube-corner elements 30 in each groove in one of the groove sets 45, 46, or 47 and such that the base plane 36 are not parallel to each other when the sheeting 60 is laid flat. Preferably, the dihedral angle α between faces 31 of adjacent cube-corner elements 30 varies in essentially all of the grooves such that the cube-corner elements are randomly tilted throughout the array. The glitter can make the sheeting very useful for aesthetic or decorative applications.

22 Claims, 5 Drawing Sheets

U.S. PATENT DOCUMENTS

| | | | |
|---|---|---|---|
| 4,601,861 | 7/1986 | Pricone et al. | 264/1.6 |
| 4,712,868 | 12/1987 | Tung et al. | 428/135 X |
| 4,775,219 | 10/1988 | Appeldorn et al. | 359/532 |
| 4,801,193 | 1/1989 | Martin | 359/518 |
| 4,938,563 | 7/1990 | Nelson et al. | 359/530 |
| 5,084,782 | 1/1992 | Taylor | 359/515 |
| 5,122,902 | 6/1992 | Benson | 428/30 X |
| 5,138,488 | 8/1992 | Szczech | 359/529 |
| 5,152,917 | 10/1992 | Pieper et al. | 51/295 |
| 5,202,180 | 4/1993 | Watts | 428/324 |
| 5,213,872 | 5/1993 | Pricone et al. | 428/195 |
| 5,272,562 | 12/1993 | Coderre | 359/529 |
| 5,276,075 | 1/1994 | Santini | 524/40 |
| 5,362,374 | 11/1994 | Chang | 205/164 |
| 5,387,458 | 2/1995 | Pavelka et al. | 428/141 |
| 5,450,235 | 9/1995 | Smith et al. | 359/529 |
| 5,454,844 | 10/1995 | Hibbard et al. | 51/295 |
| 5,470,058 | 11/1995 | Sullivan et al. | 273/DIG. 24 |
| 5,485,311 | 1/1996 | McAllister | 359/530 |
| 5,491,015 | 2/1996 | Reeves et al. | 428/76 X |
| 5,585,164 | 12/1996 | Smith et al. | 428/167 X |
| 5,592,330 | 1/1997 | Bernard | 428/913 X |
| 5,614,286 | 3/1997 | Bacon, Jr. et al. | 428/161 |
| 5,629,068 | 5/1997 | Miekka et al. | 428/161 X |
| 5,648,145 | 7/1997 | Martin | 428/156 |
| 5,691,846 | 11/1997 | Benson, Jr. et al. | 428/172 X |
| 5,814,355 | 9/1998 | Shusta et al. | |

GLITTERING CUBE-CORNER ARTICLE

TECHNICAL FIELD

This invention pertains to a cube-corner article that glitters when exposed to light.

BACKGROUND

Glittering articles have been produced for many years. The articles often are used for decorative purposes. Customarily, glitter has been produced by incorporating or suspending metallic particles into a substrate. Flakes of finely divided metallic particles such as copper, silver, aluminum, or the like have been incorporated into polymeric substrates as documented by U.S. Pat. Nos. 5,470,058, 5,362,374, 5,202,180, 3,988,494, 3,987,229, and 3,010,845. Finely divided metal flakes have also been placed in a coating substrate—see U.S. Pat. Nos. 5,276,075, 3,988,494, 3,697,070, and 3,692,731. In another approach, U.K. Patent No. 1,516,686 discloses a glittering product that is produced from non-metallised and non-reflective substrate on which a metallic, reflecting film is hot pressed, simultaneously forming an impression or copy from a printing block. The copy is engraved with adjacent zones formed by networks with varying orientation and which are too fine to be seen by the naked eye, the result being the formation of glittering zones created by the valley and peaks of the networks. The glittering zones (i.e., iridescence) are produced on a non-metallised and non-reflective substrate.

Cube-corner articles have been used in the retroreflective field for many years. See, for example, U.S. Pat. Nos. 5,138,488, 4,775,219, 4,588,258, 4,066,331, 3,923,378, 3,684,348, 3,541,606, and Re 29, 396. The articles are capable of returning substantial quantities of incident light back towards the light source, and therefore have become commonly used on road signs, barricades, and safety vests.

Figure 1:
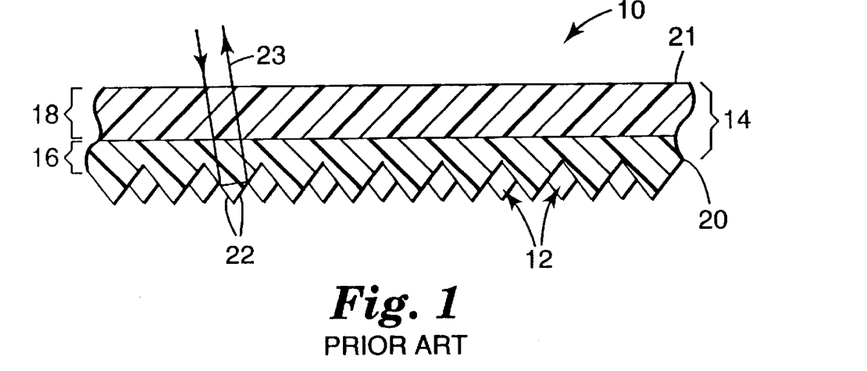
FIG. 1 is a sectional view of a prior art cube-corner sheeting 10.
Figure 2:
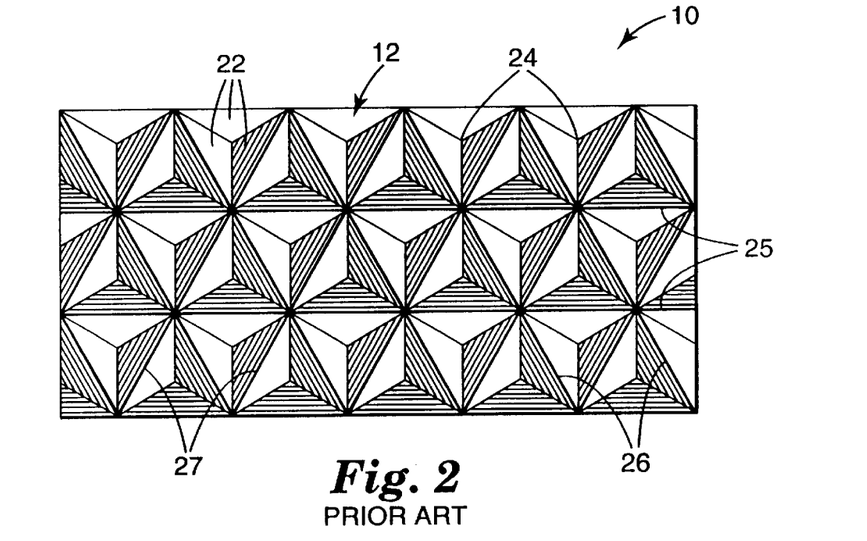
FIG. 2 is a bottom view of the prior art retroreflective sheeting 10 illustrated in FIG. 1.

FIGS. 1 and 2 illustrate an example of a cube-corner retroreflective sheeting, noted generally by numeral 10. The array of cube-corner elements 12 project from a first or rear side of a body portion 14 that includes a body layer 18 (also referred to in the art as an overlay) and may also include a land layer 16. Light enters the cube-corner sheeting 10 through the front surface 21; it then passes through the body portion 14 and strikes the planar faces 22 of the cube-corner elements 12 to return in the direction from which it came as shown by arrow 23.

FIG. 2 shows the back side of the cube-corner elements 12, where each cube-corner element 12 is in the shape of a trihedral prism that has three exposed planar faces 22. The cube-corner elements 12 in known arrays are typically defined by three sets of parallel v-shaped grooves 25, 26, and 27. Adjacent planar faces 22 on adjacent cube-corner elements 12 in each groove form an external dihedral angle (a dihedral angle is the angle formed by two intersecting planes). This external dihedral angle is constant along each groove in the array. This has been the case for a variety of previously produced cube-corner arrays.

Although cube-corner sheeting is known to provide very effective retroreflectivity, the sheetings that have been heretofore developed are not known for displaying a glittering appearance.

SUMMARY OF THE INVENTION

The present invention provides a new and very different approach to providing a glittering article. Rather than use metallic particles or flakes, as has been done in the prior art, the present invention produces glitter from a cube-corner sheeting that has a new arrangement of cube-corner elements. In brief the invention is a glittering non-retroreflective sheeting that includes an array of cube-corner elements that are arranged such that the sheeting glitters when light is incident thereon.

The terms "glitter", "glitters", or "glittering" are used herein to mean a multiplicity of discrete regions of light that appear as distinct points of light, each of which may be noticed by the unaided eye of an ordinary observer when light is incident on the sheeting, but which points of light disappear or become unnoticeable to the eye of the same observer when either the angle of the incident light source to the sheeting, the angle of observation, the sheeting's orientation, or a combination thereof are changed.

The glitter enhances the sheeting's conspicuity, and may furnish the sheeting with an aesthetic appeal and may also be useful for producing graphic images such as product identifiers. The glittering sheeting may also be useful as a decorative material and for providing decorative features to other articles. These advantages and others are more fully described below in the detailed description of the invention.

DETAILED DESCRIPTION OF THE PREFERRED EMBODIMENTS

In the practice of the present invention, a new sheeting is provided that can glitter when exposed to light. The sheeting may display at least about 10, and preferably at least about 50, points of light per square centimeter (cm²) when the sheeting is viewed under direct sunlight from the back side of the array of cube-corner elements. Typically there are less than about 250 points of light per cm² when viewed under direct sunlight.

The glittering effect is achieved by orienting cube-corner elements in a new geometric arrangement. In a preferred embodiment of this new geometric arrangement, at least one set of parallel grooves in an array of cube-corner elements has faces of adjacent cube-corner elements arranged such that the external dihedral angle formed between the faces varies along at least one groove in the set.

In another preferred embodiment, the external dihedral angle between faces of adjacent cube-corner elements varies in all grooves to such an extent that the cubes are randomly tilted across the array. What is meant by "randomly tilted" is that the cubes in the sheeting are tilted in a nonrepeating pattern relative to a reference plane that can be the front surface of the glittering sheeting when laid flat. A cube is considered "tilted" when its optical axis is not perpendicular to the reference plane. The "optical axis" is customarily understood as being the internal line that extends from the cube apex and forms equal angles with each cube edge that extends from the apex. In other words, the optical axis is the line defined by the intersection of three planes that each bisect one of the three internal dihedral angles formed by the cube-corner element's three planar faces. All previously known cube-corner sheetings have had the cube-corner elements arranged in a predetermined repeating pattern throughout the array. If a known cube-corner sheeting is thought of as an army that marches in cadence in strict formation, a randomly-oriented sheeting would be a drunken army where each cube-corner element represented individual soldiers that staggered and bumped into one another as they march.

Figure 3:
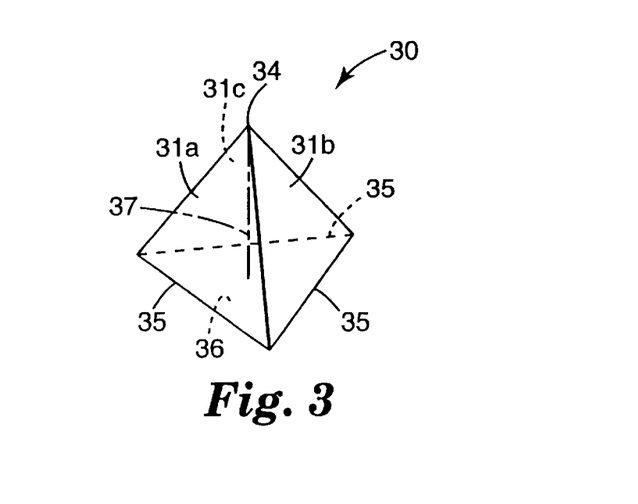
FIG. 3 is an isometric view of a cube-corner element 30 that may be used in a glittering sheeting of the invention.

FIG. 3 illustrates a cube-corner element 30 that is useful in glittering sheetings of the invention (60, FIG. 4) as well as in retroreflective sheetings of the prior art (10, FIG. 1). As shown, a cube-corner element 30 is a body that has three mutually perpendicular faces 31a, 31b, and 31c that meet at the cube's apex 34. The cube's base edges 35 are generally linear and generally lie in a single plane that defines the base plane 36 of the element 30. Cube-corner element 30 also has a central axis 37, which is the tri-sector of the internal angles defined by lateral faces 31a, 31b, and 31c. The optical axis may be disposed perpendicular to the base plane 36, or it may be canted as described in U.S. Pat. No. 4,588,258 to Hoopman and U.S. Pat. No. 5,138,488 to Szczech. In addition to defining a single cube-corner by a three-sided pyramid having a triangular base plane such as disclosed in the Hoopman patent, the cube-corner elements may be defined by a rectangular base, two rectangular sides, and two triangular sides such that each structure has two cube-corners each such as disclosed in U.S. Pat. No. 4,938,563 to Nelson et al., or may be of essentially any other cube-corner shape.

Figure 4:
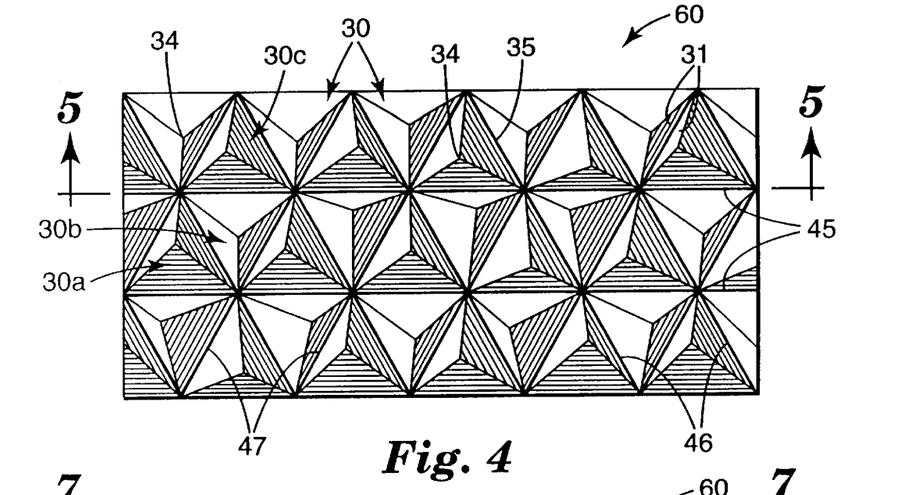
FIG. 4 is a bottom view of a glittering sheeting 60 in accordance with the present invention.

FIG. 4 shows the structured surface or backside of a cube-corner sheeting 60, which includes a unitary or single layered array of cube-corner elements 30, like those depicted in FIG. 3. Each cube-corner element 30 meets, but is not necessarily connected to, an adjacent cube-corner element at a base edge 35. The array includes three sets of generally parallel grooves 45, 46, and 47. The external dihedral angles (α, FIG. 5) between faces 31 of adjacent cube-corner elements 30 vary along the grooves 45–47 in the array. The cube-corner elements in the array are randomly tilted, and because of this, the apex 34 of one cube, such as cube 30a may be relatively close to another apex such as cube 30b, but cube 30b's apex may then be farther away from another adjacent apex such as the apex of cube 30c.

Figure 5:
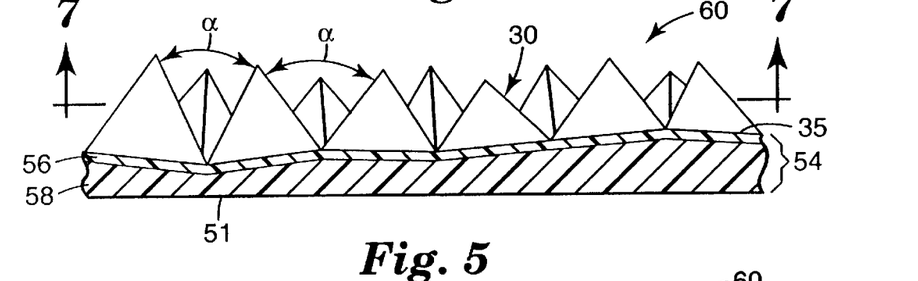
FIG. 5 is a sectional view of a glittering sheeting 60 taken along lines 5—5 of FIG. 4.

FIG. 5 also illustrates the position of one cube apex relative to another and additionally shows how the cube's base edges 35 do not lie in the same common plane. The base edge 35 of one cube may be disposed closer to or farther away from the front surface 51 of glittering sheeting 60 than the base edges of other adjacent cube-corner elements. And in a single cube, points on one of its base edges 35 may be located closer to or farther away from front surface 51 than points on another base edge 35 in the same cube. Base edges 35 define the lowest point of grooves 45–47—and because edges 35 do not all lie in the same plane, the grooves have a varying pitch along their length. If the cube-corner sheeting possesses a land layer 56, it too is also not uniformly spaced from the front surface 51. When the cube-corner elements are tilted, the base planes 36 (FIG. 3) of each cube-corner element are not parallel, and they do not reside in the same plane. Many of the base planes also do not reside in the same plane as the front surface 51—that is, the base planes are not parallel to the sheeting's front surface 51 when the sheeting is laid flat on a surface.

Cube-corner element sheetings have been produced where some of the element's base planes do not reside parallel to the sheeting's front surface when the sheeting is laid flat. Such sheetings, however, are retroreflective and therefore have had the array of cube-corner elements disturbed or rearranged in certain areas by sealing a film to the backside of the array (such as discussed below with reference to FIGS. 8 and 9) or by creating bubbles (U.S. Pat. No. 5,485,311 to McAllister). The seal line and the bubbles upset the sheeting's front surface and the orientation of the cube-corner elements in the array. For purposes of this invention, therefore, a sheeting is not considered to be "laid flat" in those areas where the sheeting is disturbed by seal lines (item 64 FIGS. 8 and 9) or bubbles (24 of the '311 patent). The base planes 36 (FIG. 3) in sheetings of the invention may be offset at angles of zero to 90 degrees from the reference plane or front surface when the sheeting is laid flat. The base planes that are tilted relative to the front surface of the sheeting when laid flat typically form an angle of about 1 to 10 degrees from the front surface.

FIG. 5 also shows the external dihedral angle, α, that defines the angle between faces 31 (FIG. 4) of adjacent cube-corner elements 30. Angle α may vary along some or all grooves in a single generally parallel groove set, it may vary along some or all grooves in two generally parallel groove sets, or it may vary along some or all grooves in all three generally parallel groove sets in the array. In an array of randomly tilted cube-corner elements, angle α varies randomly amongst adjacent faces of adjacent cube-corner elements throughout essentially the whole array that is intended to glitter. Angle α may vary from zero degrees to 180 degrees, but on average ranges from about 35 to 115 degrees for dihedral angles between faces of adjacent cubes.

Figure 6:
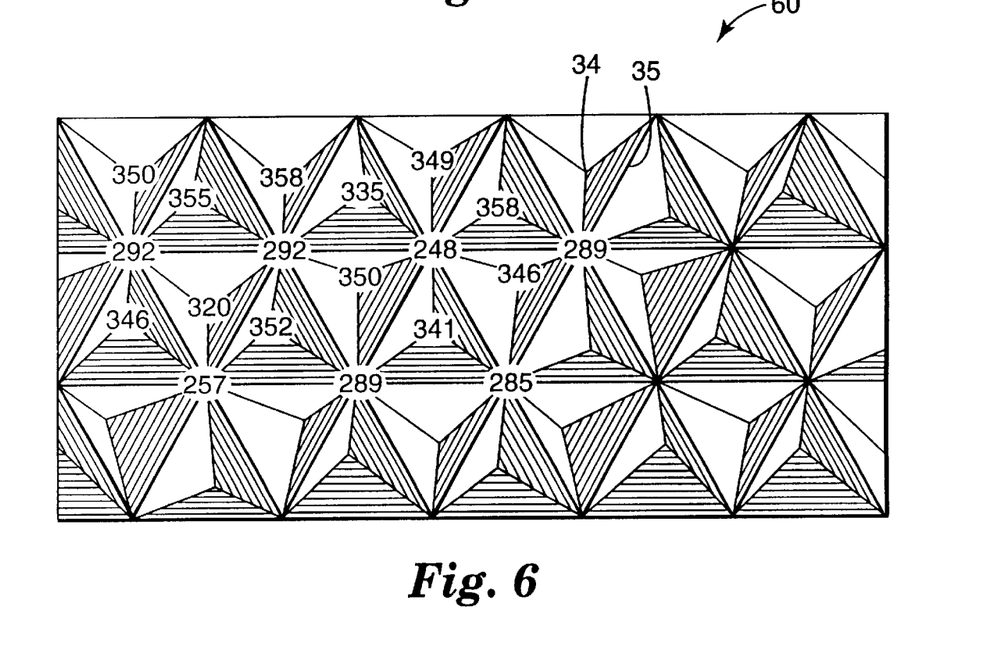
FIG. 6 is a bottom view of a glittering sheeting 60, illustrating apex and groove intersection heights from a reference plane.

FIG. 6 illustrates some typical distances of apexes 34 and groove intersections from the sheeting's front surface 51 (FIG. 5). The cube-corner element in the upper left hand corner of the array has an apex that is spaced 350 micrometers from the front surface 51. The fourth cube over from the upper left-hand corner, however, has an apex height of 335 micrometers. There is thus a difference in apex height of 15 micrometers between cubes that are fairly close to one another. The cube-corner elements typically have an average height of about 10 to 500 micrometers, more typically of about 20 to 200 micrometers. For cube-corner elements that are about 20 to 200 micrometers high, the variation in height between adjacent apexes typically is about 0 to 60 micrometers and typically is about 1 to 40 micrometers on average, more typically 2 to 25 micrometers on average, but preferably does not exceed more than 50 micrometers on average. The variation in height between adjacent groove intersections for such cubes typically is about 0 to 100 micrometers and typically is about 3 to 50 micrometers on average, but preferably does not exceed more than 60 micrometers on average.

The body layer 58 (FIG. 5) in body portion 54 (FIG. 5) typically has an average thickness of approximately 20 to 1200 micrometers but could be essentially any thickness. The optional land layer 56 (FIG. 5) preferably is kept to a minimal thickness of 0 to less than about 100 micrometers.

In the cube-corner element array shown in FIGS. 4–6, the groove sets 45, 46, and 47 are illustrated as being parallel. It is within the scope of this invention, however, for grooves of the same set to be other than parallel. Some grooves may be parallel and others may not. Some grooves may run parallel to adjacent grooves of the same groove set in some regions of the sheeting but may also cross paths or overlap those same grooves. In such instances, the cube-corner elements may pile up on each other. As long as there are two or more grooves that extend in the same general direction roughly parallel to each other, those grooves are viewed as being "generally parallel" regardless of whether the grooves at some other point cross paths, overlap, converge, or diverge.

Although sheetings of the invention comprise an array of cube-corner elements that normally would allow the sheeting to retroreflect light incident on front surfaces 51, glittering sheetings of the invention are rendered non-retroreflective by making the body portion 54 or cube-corner elements opaque, for example, by using fillers, opaque pigments, flakes, or other particulate additives, or by preventing light from passing through the front surface 51 of sheeting 61 by placing an opaque coating or film (not shown) on the sheeting's front surface 51 or by placing the sheeting face down on an opaque surface. Glittering sheetings are also rendered non-retroreflective by coating or applying materials to the backsides of the cube-corner elements. Alternatively, the glittering sheeting of the invention may be rendered non-retroreflective by altering the exposed cube-corner faces such as by etching or by altering the internal cube-corner geometry. Glittering sheetings of the invention may also be used with the front surface typically mounted to or juxtaposed against another substrate such that the back side of the array of cube-corner elements is exposed to light. Light incident on the backside of the array of cube-corner elements is reflected toward a viewer in a nonuniform pattern such that numerous points of light become visible to the viewer as glitter.

Figure 7:
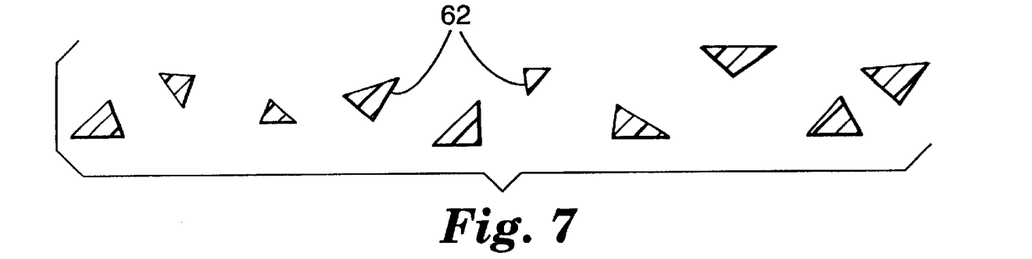
FIG. 7 is a sectional view of a glittering sheeting 60 taken along lines 7—7 of FIG. 5.

FIG. 7 shows cube-corner elements intersected by a plane that is parallel to the glittering sheeting's front surface 51 (FIG. 5). As illustrated, the plane intersects the cube-corner elements to produce triangles 62 of different cross-sectional areas. Some cubes may be tilted to such an extent that the intersecting plane only passes through a tip of the cube, resulting in a small triangular cross-section—whereas, a cube that stands upright may be intersected such that the triangle resulting from the cross-section is relatively large. Thus, even though the cube-corner elements in the array may be of similar size, they can produce triangles of random sizes when intersected as described because of the manner in which the cubes are tilted with respect to a reference plane.

The inventive glittering cube-corner sheetings can be made in accordance with two techniques. In the first technique, a glittering cube-corner sheeting is made by providing a first cube-corner sheeting that has the cubes arranged in a conventional configuration, namely, a non-random orientation, and exposing this sheeting to heat, pressure, or a combination of both. In the second technique, a mold is produced that is a negative of a cube-corner sheeting of the invention. This mold may then be used to provide a glittering sheeting. A method of making glittering sheetings is described in U.S. patent application Ser. No. 08/641,129 entitled "Method of Making Glittering Retroreflective Sheetings" filed on the same day as this application under attorney docket number 52374USA1A.

When using the first technique, a cube-corner sheeting is first produced or otherwise obtained which has the cube-corner elements arranged in an ordered configuration. There are many patents that disclose sheetings that have ordered arrays of cube-corner elements: see, for example, U.S. Pat. Nos. 5,236,751, 5,189,553, 5,175,030, 5,138,488, 5,117,304, 4,938,563, 4,775,219, 4,668,558, 4,601,861, 4,588,258, 4,576,850, 4,555,161, 4,332,847, 4,202,600, 3,992,080, 3,935,359, 3,924,929, 3,811,983, 3,810,804, 3,689,346, 3,684,348, and 3,450,459. Ordered cube-corner arrays may be produced according to a number of known methods, including those disclosed in the patents cited in the previous sentence. Other examples are disclosed in U.S. Pat. Nos. 5,450,235, 4,322,847, 4,486,363, 4,322,847, 4,243,618, 3,811,983, 3,689,346, and in U.S. Pat. No. 5,691,846.

Preferably, the cube-corner elements that are used in the non-randomly oriented starting sheeting are made from materials that are harder than the materials used in the body portion, particularly the body layer. A selection of such materials allows the cube-corner elements to tilt, without significantly distorting each cube's shape, when the sheeting is exposed to certain amounts of heat and/or pressure. The heat, pressure, or both that are applied to the sheeting should be sufficient to alter the array significantly from its ordered configuration. With a very soft body layer, pressure alone, that is, pressure above atmospheric, or heat alone, namely, heat greater than the softening temperature may be sufficient to change the array from an ordered configuration.

Figure 8:
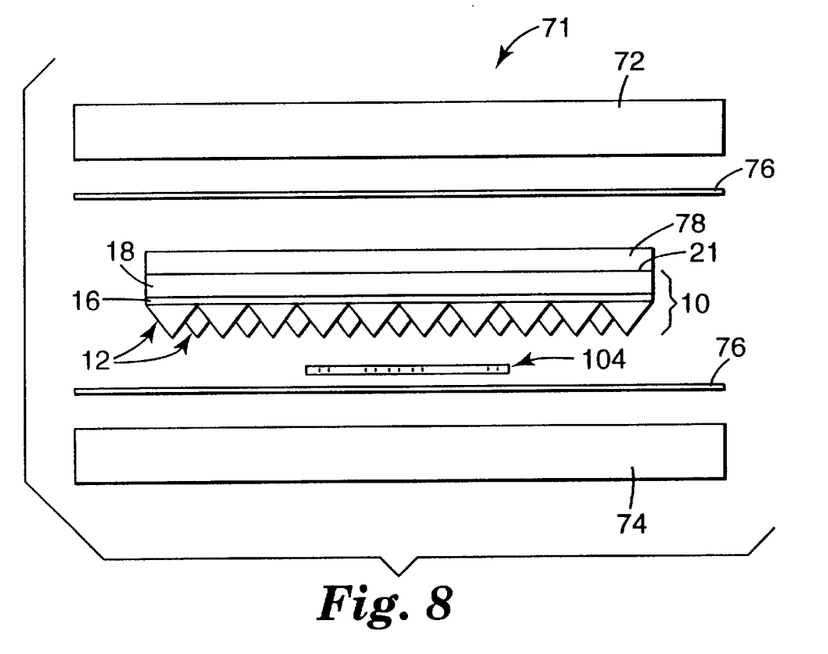
FIG. 8 is a schematic view of how a glittering sheeting can be made by exposing a sheeting 10 to heat and pressure in a laminating apparatus 71.

A Hix N-800 laminator has a first pressure-applying surface 72 that is made of metal and that may be heated to temperatures as high as 500° F. The second pressure-applying surface 74 is an unheated rubber mat. In operation, two layers of release paper 76 may optionally be disposed between the surfaces 72 and 74 and the cube-corner sheeting 10. A carrier 78 (such as made from polyester) may be disposed on the cube-corner sheeting's front surface 51. Carrier 78 is a byproduct of the process used to produce sheeting 10 (see, for example, U.S. Pat. No. 5,691,846 at the discussion describing its FIG. 4, where the carrier is represented by numeral 28) and may optionally remain thereon until after the cube-corner elements have been rearranged from exposure to heat and/or pressure.

When the ordered, non-glittering cube-corner sheeting and optional release paper 76 are arranged in the heat lamination machine as shown in FIG. 8, the machine is activated so that the pressure-applying surfaces 72 and 74 move toward each other and hold the ordered cube-corner sheeting at a desired temperature and pressure for a predetermined time. If desired, the lower release paper 76 in FIG. 11 may be omitted, and the pattern or image of the lower, unheated surface 74 of the heat laminating machine may be transferred to the retroreflective sheeting in a glittering pattern. In lieu of a laminating machine, a vacuum former— such as a Scotchlite™ Heat Lamp Applicator available from Dayco Industries, Inc., Miles, Mich. P.M. Black Co., Stillwater, Minn. and Converting Technologies, Inc., Goodard, Kansas—may be used.

A cube-corner retroreflective sheeting that has hard cubes and a softer body layer is disclosed in U.S. Pat. No. 5,450,235 to Smith et al. As described in this patent, the body portion includes a body layer that contains a light transmissible polymeric material that has an elastic modulus less than $7 \times 10^8$ Pascals. The cube-corner elements, on the other hand, contain a light transmissible polymeric material that has an elastic modulus greater than $16 \times 10^8$ Pascals. U.S. Pat. No. 5,691,846 also discloses a number of materials that may be used to produce cube-corner sheetings in accordance with this invention. This patent application specifies that the elastic modulus of the cube-corner elements is at least $1 \times 10^7$ Pascals greater than the elastic modulus of the body layer and that its cube-corner elements may be made from materials that have an elastic modulus greater than about $2.0 \times 10^8$ Pascals (preferably greater than about $25 \times 10^8$ Pascals) and that the body layer or overlay may be made from materials that preferably have an elastic modulus less than about $13 \times 10^8$ Pascals. When a cube-corner sheeting made from materials of those designated elastic modulus values is exposed to certain amounts of heat and pressure, the body layer softens, allowing the cubes to move in response to the pressure and thus become tilted relative to the sheeting's front surface. When using such a construction, the land layer (56, FIG. 7) ideally is kept to a minimal thickness (for example, less than ten percent of the cube-corner element height), and preferably zero thickness, so that the cubes can easily tilt along their base edges. For this same reason, it is also preferred in this invention that the cube-corner elements are fractured along their base edges as disclosed in U.S. Pat. No. 5,691,846 and in U.S. patent application Ser. No. 5,691,846.

Elastic modulus may be determined according to standardized test ASTM D 882-75b using Static Weighing Method A with a five inch initial grip separation, a one inch sample width, and an inch per minute rate of grip separator. Under some circumstances, the polymer may be so hard and brittle that it is difficult to use this test to ascertain the modulus value precisely (although it would be readily known that it is greater than a certain value). If the ASTM method is not entirely suitable, another test, known as the "Nanoindentation Technique" may be employed. This test may be carried out using a microindentation device such as a UMIS 2000 available from CSIRO Division of Applied Physics Institute of Industrial Technologies of Lindfield, New South Wales, Australia. Using this kind of device, penetration depth of a Berkovich pyramidal diamond indenter having a 65 degree included cone angle is measured as a function of the applied force up to the maximum load. After the maximum load has been applied, the material is allowed to relax in an elastic manner against the indenter. It is usually assumed that the gradient of the upper portion of the unloading data is found to be linearly proportional to force. Sneddon's analysis provides a relationship between the indenting force and plastic and elastic components of the penetration depth (Sneddon I.N. *Int. J. Eng. Sci.* 3, pp. 47–57 (1965)). From an examination of Sneddon's equation, the elastic modulus may be recovered in the form $E/(1-v^2)$. The calculation uses the equation:

$$E/(1-v^2)=(dF/dh_e)F_{max}1/(3.3h_{pmax}\tan(\theta))$$

where:

v is Poisson's ratio of the sample being tested;

$(dF/dh_e)$ is the gradient of the upper part of the unloading curve;

$F_{max}$ is the maximum applied force;

$h_{pmax}$ is the maximum plastic penetration depth;

θ is the half-included cone angle of the Berkovich pyramidal indenter; and

E is the elastic modulus.

It may be necessary to correlate the results of the nanoindentation technique back to the ASTM method.

The amount of heat and/or pressure applied to a cube-corner sheeting 10 may vary depending on the materials from which the cube-corner sheeting is made. It has been discovered in this invention that when polymeric materials having an elastic modulus of about $10 \times 10^8$ to $25 \times 10^8$ Pascals are used in the cube-corner elements 12 (and an optional land layer 16), and a polymeric material having an elastic modulus of about $0.05 \times 10^8$ to $13 \times 10^8$ Pascals is used in the body layer 18, the cube-corner sheeting, preferably, is heated to a temperature of about 300 to 400° F. (150 to 205° C.) and that about $7 \times 10^4$ to $4.5 \times 10^5$ Pascals (10 to 60 psi) of pressure are applied to the article. Using polymers that have a relatively high elastic modulus, for example, greater than $16 \times 10^8$ Pascals, the geometry of each cube, namely, its internal dihedral angles, are generally maintained to within a couple of degrees.

Figure 9:
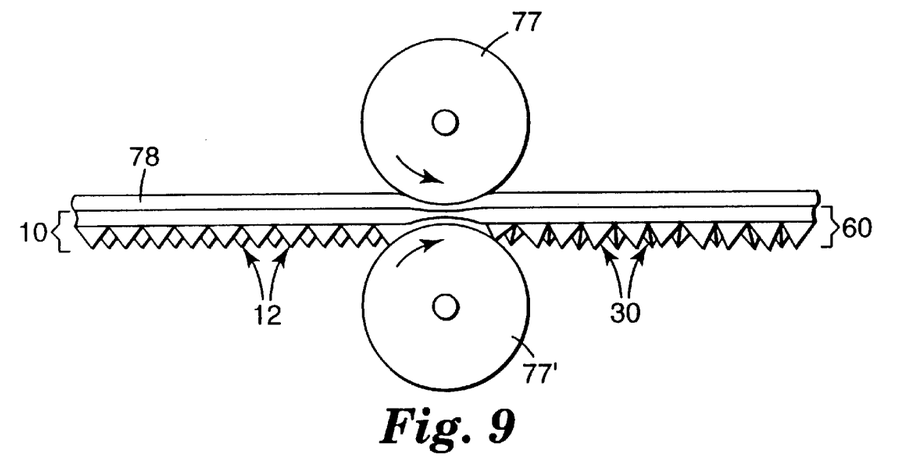
FIG. 9 is a schematic view of an alternative method of exposing a sheeting 10 to heat and pressure to produce a glittering sheeting 60.

In FIG. 9, a continuous method is shown for applying heat and/or pressure to a conventional sheeting 10 to produce a glittering sheeting 60. In this method, sheeting 10, having the optional carrier film 78 disposed thereon, is fed through the nip formed by rolls 77 and 77'. As shown, cube-corner elements 12 are in a non-random, ordered configuration before being exposed to the heat and/or pressure from rolls 77 and 77', but after exiting the rolls they are randomly tilted, and the dihedral angles formed between adjacent cube-corner elements vary along each groove in the array. The base planes of each cube-corner element also do not reside in the same general plane. The sheeting 60 that exits the rolls is capable of producing a glittering effect, whereas the cube-corner sheeting 10 that has not been exposed to sufficient amounts of heat and/or pressure is incapable of producing such an effect. The amounts of heat and/or pressure that may be used in this continuous method are similar to those used in the batchwise method for similar starting materials. When using heat, either or both rolls 77 and 77' may be heated to the temperature sufficient to alter the cube configuration.

In the second technique for producing a glittering cube-corner sheeting, a mold may be used that is a negative of a glittering cube-corner sheeting. Such a mold may be made from a glittering cube-corner sheeting that is produced by the first technique described above. That is, the structured surface or backside of an array of, for example, randomly-tilted cube-corner elements can be used as a pattern to produce the mold. This can be accomplished, for example, by depositing suitable mold material(s) onto the back side of an array of randomly tilted cube-corner elements and allowing the mold material(s) to harden in place. The randomly tilted cube-corner sheeting that is used as the pattern may then be separated from the newly formed mold. The mold is then capable of producing cube-corner sheetings that glitter.

As an alternate method of producing a mold, a diamond tool may be used to fashion the array of cube-corner elements. This may be accomplished by, for example, using a number of diamond cutting tools, each tool being able to cut the groove which forms one of the desired dihedral angles between adjacent cube-corner elements. Groove depth and angle between adjacent cube-corner element faces in any single groove is determined by the profile of the diamond cutting tool that is used to cut the mold material.

To prepare a mold having cube-corner elements with varying dihedral angles between faces of adjacent cube-corner elements along the groove, it is necessary to position a diamond cutting tool capable of cutting the first desired dihedral angle, insert it into the mold material and cut the groove portion that extends from one groove intersection to the adjacent groove intersection. The tool is then removed from the mold material, and the diamond cutting tool is replaced by a tool that is capable of cutting the next desired dihedral angle along the groove. The newly selected tool is then positioned in the growing groove as close as possible to the location where the first cutting tool finished cutting. Cutting the groove is then continued with the second cutting tool until the next groove intersection is reached. The second cutting tool is then removed from the mold material and replaced with a cutting tool capable of cutting the third desired dihedral angle in preparation for cutting the next groove portion. This process is continued for the length of the groove. After completion of the first groove, the next or adjacent groove may be cut in the same manner using various cutting tools and incremental cuts until the desired number of parallel, or generally parallel, grooves have been completed.

After the first set of grooves is complete, the diamond cutting tool is adjusted so that the second set of parallel grooves may be cut such that they intersect with the first set and contain varying dihedral angles between adjacent cube-corner faces. This process is continued until the desired number of sets of generally parallel grooves are cut into the mold material.

A mold also may be produced using pin bundling techniques. Molds manufactured using pin bundling are made by assembling together individual pins that each have an end portion shaped with features of a cube-corner retroreflective element. U.S. Pat. No. 3,632,695 to Howell and U.S. Pat. No. 3,926,402 to Heenan et al. disclose illustrative examples of pin bundling. A plurality of pins are typically fashioned to have an optically active surface on one end disposed at an oblique angle to the longitudinal axis of the pin. The pins are bundled together to form a mold having a structured surface in which the optical surfaces combine to form the cube-corner elements. The mold may be used to form glittering sheeting or to generate other molds useful in manufacturing cube-corner sheeting. Pins may be arranged such that the dihedral angle between optical faces of adjacent cube-corner elements vary. One advantage associated with pin bundling techniques is that the dihedral angle may be varied in a single groove set or in two or more groove sets. The pins also can be configured such that there are no generally parallel grooves and/or such that the cube-corner elements do not possess base planes that are parallel to one another when the resulting sheeting is laid flat. Pin bundling thus can provide additional flexibility in producing glittering sheetings.

Figure 10:
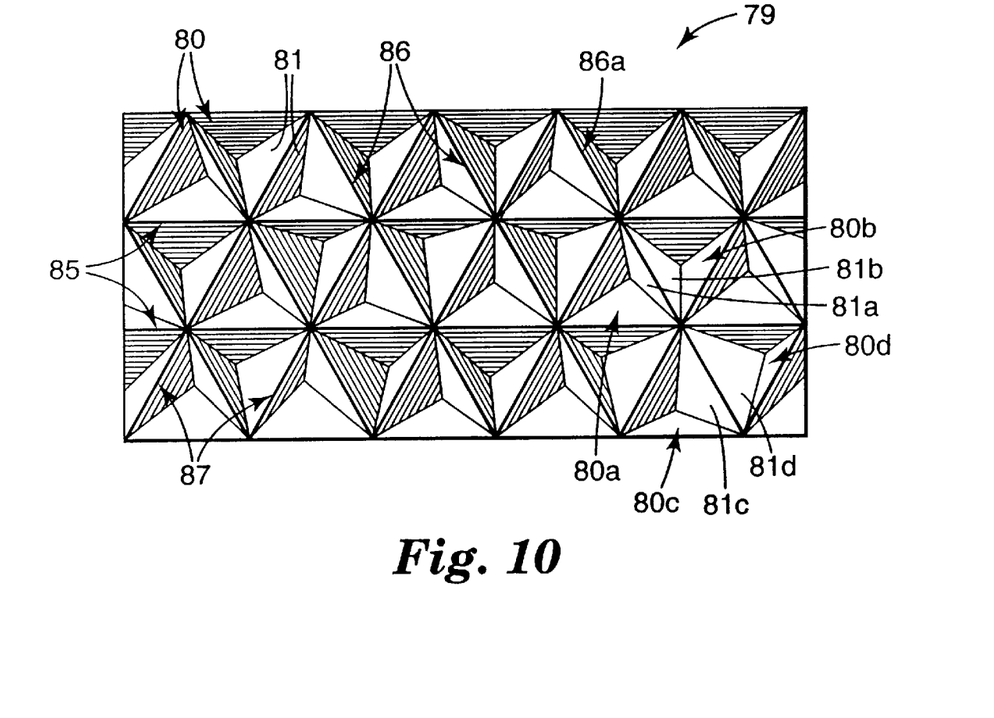
FIG. 10 is a top view of a mold 79 that may be used to produce a glittering sheeting.

FIG. 10 illustrates a mold 79 that is a negative of an array of cube-corner elements that comprise a glittering sheeting. The mold (also referred to in the art as a tool) therefore may possess three sets of parallel v-shaped grooves 85, 86, and 87, and the planar faces 81 of adjacent cube-corner elements 80 can form dihedral angles that vary in dimension along each groove in the mold's array. For example, in groove 86a, faces 81a and 81b of adjacent cubes 80a and 80b form a tighter dihedral angle $\alpha$ (FIG. 5) than faces 81c and 81d of cubes 80c and 80d. The mold may be essentially the same as the array of cube-corner elements of the invention with the exception of being a negative thereof, and since it may not need to transmit light or be conformable, it may be made from an opaque material that is relatively inflexible, for example, metal. A mold useful for producing glittering sheetings of the invention is described in U.S. patent application Ser. No. 08/640,383 entitled "Mold for Producing Glittering Cube-Corner Retroreflective Sheetings" filed on the same day as this application under attorney docket number 52471USA5A.

Figure 11:
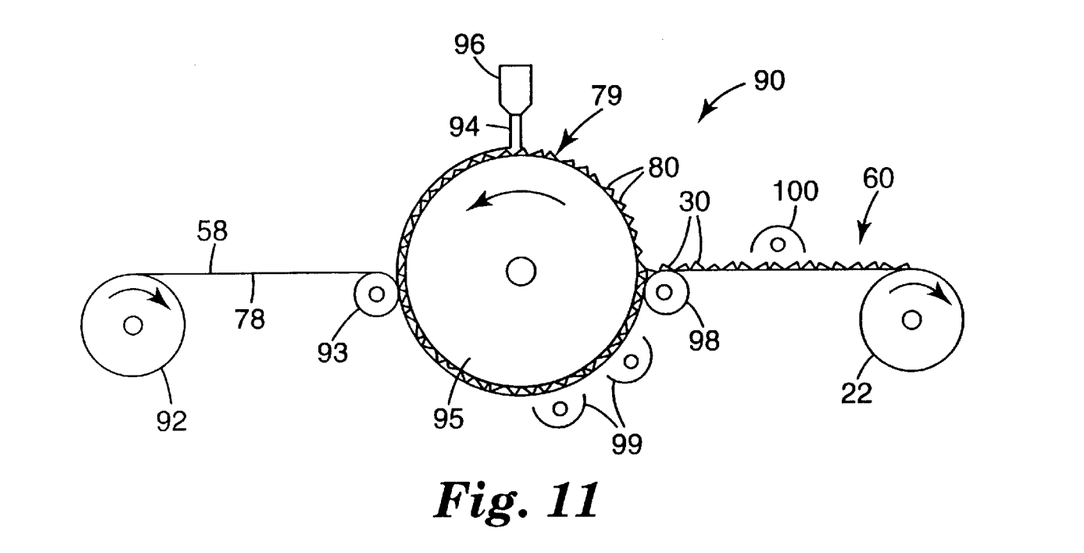
FIG. 11 is a schematic view of a second technique for making a glittering sheeting 60 by casting the sheeting from a mold 79.

FIG. 11 schematically shows how a structured article that is capable of glittering may be formed from a mold 79 of the invention. The method includes an apparatus, shown generally as 90, for casting and curing composite sheeting 60. As shown, body layer 58 is drawn from a roll 92 to a nip roller 93 such as a rubber coated roller. At roller 93, the body layer 58 contacts a suitable resin formulation 94 previously applied to a patterned mold 79 on a roll 95 through a coating die 96. The excess resin 94 extending above the cube-corner elements 80 may be minimized by setting nip roller 93 to a width setting that is effectively less than the height of the cube-corner forming elements of mold 79. In this fashion, mechanical forces at the interface between nip roller 93 and mold 79 ensure that a minimum amount of resin 94 extends above the mold elements 80. Depending on its flexibility, the body layer 58 may be optionally supported with a suitable carrier film 78 that provides structural and mechanical integrity to the body layer 58 during casting and curing, and which is stripped from the body layer 58 after the sheeting is removed from the mold 79 at roll 98. Use of a carrier film 78 is preferred for low modulus body layers 58.

The method shown in FIG. 11 may be altered such that the resin 94 is applied to the body layer 58 first rather than being first deposited on the mold 79. This embodiment for a continuous process is discussed in U.S. Pat. No. 5,691,846 with reference to its FIG. 5.

As shown in FIG. 11, the resin composition that forms the array of cube-corner elements can be cured in one or more steps. Radiation sources 99 expose the resin to actinic radiation, such as ultraviolet light or visible light, depending upon the nature of the resin, in a primary curing step. The actinic radiation from source 99 irradiates the resin through the layer 58—thus imposing a requirement that the body layer 58 transmit radiation to allow curing to occur. Alternatively, curing can be performed by irradiation through the mold 79—if the mold used is sufficiently transparent to transmit the selected radiation. Curing through both the tool and the body layer also may be carried out.

The primary curing may completely cure the cube-corner elements, or may partially cure the resin composition to a degree sufficient to produce dimensionally stable cube-corner elements that no longer require the support of the mold 79. The sheeting 60 can then be removed from the mold 79, exposing the sheeting's cube-corner elements 30. One or more secondary curing treatments 100, selected depending upon the nature of the resin, can then be applied to fully cure the array of cube-corner elements and strengthen the bond between the array of cube-corner elements and the body layer. This bifurcated curing approach can permit optimized processing and materials selection. For instance, a sheeting made from a body layer that contains an ultraviolet absorber (to impart greater durability and weathering ability) can be made by applying a primary curing treatment of visible light through the light-transmissible body layer, and then removing the sheeting from the mold 79 at roll 98 and applying a second curing treatment 100 of ultraviolet radiation to the exposed cube-corner elements. Such a bifurcated approach may permit faster overall production.

The extent of the second curing step depends on a number of variables, among them the rate of feed-through of the materials, the composition of the resin, the nature of any crosslinking initiators used in the resin formulation, and the geometry of the mold. In general, faster feed rates increase the likelihood that more than one curing step is needed. Selection of curing treatments depends in large part on the specific resin chosen for producing the cube-corner elements. Electron beam curing could be used, for example, in lieu actinic radiation.

When using a mold to prepare glittering retroreflective sheeting, thermal curing materials may be used. In this case, the mold is heated to a temperature sufficient to cause development of enough cohesion in the newly formed glittering cube-corner material to allow it to be removed from the mold without damaging the physical or optical properties of the newly formed sheeting. The selected temperature is a function of the thermal curing resin. Thermal curing may be achieved, for example, by heating the resin, by heating the mold, or by heating the glittering sheeting by indirect means. Combinations of these methods also may be used. Indirect heating includes methods such as heating with lamps, infrared or other heat source filaments, or any other convenient method. The mold may also be housed in an oven or other environment that is maintained at the temperature required by the thermal curing resin selected.

After the glittering retroreflective sheeting has been removed from the mold, it may be further treated by exposure to heat from an oven or other heated environment. Such subsequent heat treatment may adjust the sheeting's physical or other properties to some desired state, to complete reactive processes in the sheeting, or to remove volatile substances such as solvents, unreacted materials, or by-products of the thermal curing system.

Thermal curing resins may be applied to the mold as solutions or as neat resin formulations. Resins also may be either reactively extruded or extruded in the molten state onto the mold. Methods of thermal curing after applying the resins to the mold, and any subsequent exposure of the sheeting to heat, may be done independent of applying the thermal curing resin to the mold.

An advantage of glittering sheeting made from thermal curing materials in a mold is that both the cube-corner elements 30 (FIG. 3) and body portion 54 (FIG. 5) may be made from the same substance, which may be applied to the mold in a single operation. A consequence of this construction is that the sheeting may exhibit uniform materials and properties throughout the sheeting. A further advantage is that constructions of this type do not require a separate body layer to be applied as illustrated in FIG. 11.

In addition to curing treatments, sheeting may also be heat treated after it is removed from the mold. Heating serves to relax stresses that may have developed in the body layer or in the cube-corner elements, and to drive off unreacted moieties and byproducts. Typically, the sheeting is heated to an elevated temperature, for example, above the polymer's glass transition temperature(s).

In lieu of cast-and-cure methods, glittering sheetings of the invention may also be produced by embossing a polymeric sheet over a mold that possesses cube-corner elements arranged in accordance with the present invention. Examples of embossing methods are disclosed in U.S. Pat. Nos.: 5,272,562, 5,213,872, and 4,601,861.

Glittering sheetings that display images also may be produced in accordance with the present invention.

Figure 12:
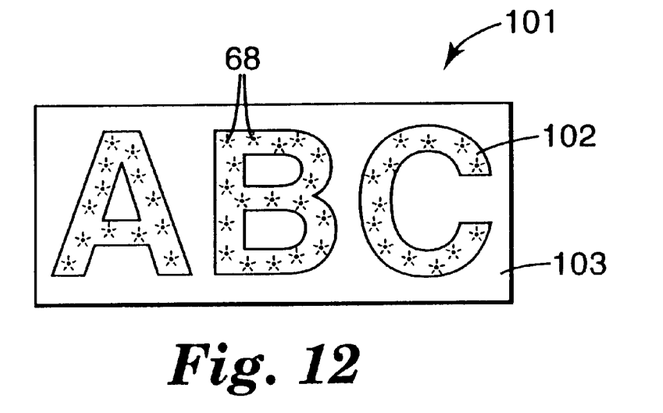
FIG. 12 is a front view of an imaged sheeting 101 that has glittering and non-glittering regions 102 and 103, respectively.

FIG. 12 illustrates a glittering article 101 that displays the image "ABC". The image 102 in this case is characterized by a glittering area, while the background 103 is characterized by a non-glittering area. As used herein, an "image" may be any combination of alphanumeric characters or other indicia that stands out in contrast to the background. Glittering imaged articles, like article 101, may be produced as described below.

Imaged glittering sheeting may be produced in a first embodiment by inserting a material in the shape of the desired image into the assembly shown in FIG. 8. Thin material in the shape of the desired image, such as an insert 104 (104 refers generically to any suitable insert including 104a and 104b of FIGS. 16a and 16b) in FIG. 8 can be placed between the cube-corner reflective elements 30 and the optional lower release liner 76. The image materials may be a polymeric film made from, for example, polyester. The insert 104 may comprise a large, smooth sheet from which the desired image has been cut, forming a negative image in the insert. Subjecting this arrangement to processing conditions of elevated temperature and/or pressure results in a sheeting that bears the desired image as a glittering portion on a background that is substantially not glittering or that has a low level of glittering. When the insert 104 is in the size and shape of the desired image, subjecting the sheeting 10 to elevated temperature and/or pressure results in sheet material that bears a non-glittering image corresponding to the insert 104 on the glittering background. A preferred embodiment is without the release liner 76.

An insert 104 can be placed with the image forming elements in contact with exposed cube-corner elements 30 as shown in FIG. 8, or on the top face of the ordered retroreflective sheeting 10 with image forming elements 106 contacting the optional polyester film liner 78 or directly contacting the front surface 51. Alternatively, an ordered cube-corner sheeting 10 may be inserted in laminator 71 with the cube-corner elements 30 facing the heated laminator surface 72, and the front surface 51 (and optional carrier 78) facing an unheated laminator surface 74. Thus, an image forming insert may be disposed either above or below the sheeting.

Figure 13A:
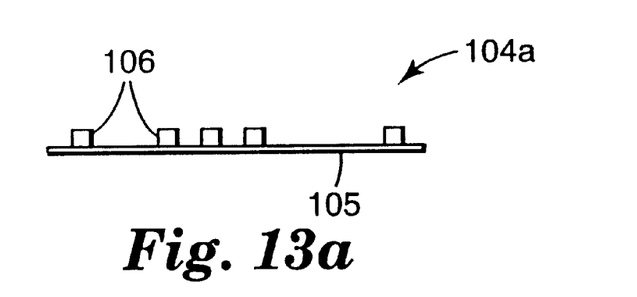
FIG. 13a is a side view of an insert 104a that may be used to produce an image in a glittering sheeting of the present invention

In FIG. 13a an image insert 104a is shown that may comprise a durable material 105 that bears projections 106 rising away from the surface of the sheet material 105. In this embodiment, the projections 106 form the desired image. An example of such a device is a flexographic printing plate. When this type of image bearing device is placed in the arrangement of FIG. 8 such that the image forming projections 106 of insert 104a contact the exposed cube-corners and the assembly is subjected to elevated temperature and/or pressure, a sheeting is produced that bears a glittering image on a substantially non-glittering background.

The degree and extent of glittering may be controlled by the process conditions. For example, processing with a flexographic printing plate for short time periods results in an image that is capable of glittering only at the points where projections 106 directly contact the backside of the cube-corner elements 30. Non-contact areas remain and substantially not glittering. As processing time increases, and as processing temperature increases, the extent of glittering extends away from the contact points of projections 106, and the resulting image gradually changes from (a) glittering only at contact points to (b) a glittering image on a glittering background, to (c) a non-glittering image (where cube-corners have been substantially pushed out of the contact areas) on glittering background.

Figure 13B:
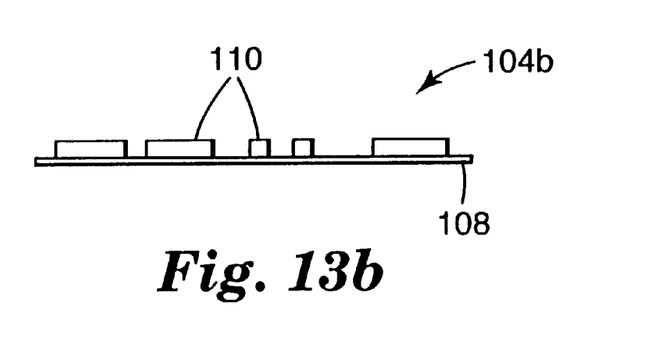
FIG. 13b is a side view of an insert 104b that may be used to produce a glittering sheeting of the present invention.

In FIG. 13b, an image forming element 104b is shown that may comprise a carrier material 108 on which a heat-transferrable material 110 has been deposited in the shape and size of the desired image. For example, heat-transferrable ink 110 may be deposited on a carrier film 108 in the form of the image to be transferred. The carrier film 108 bearing the desired image is placed as an insert 104 in a laminator 71 of FIG. 8 such that the exposed back side of the cube-corner elements 30 contacts the image surface 110 on carrier film 108. The arrangement is subjected to the processing conditions of elevated temperature and/or pressure, and the resulting sheeting bears an image on a glittering background.

The image bearing insert 104 in FIG. 8 also may be a large piece of fabric (not shown) or other material bearing an overall pattern or texture. In the case of a fabric insert, the image carried by the insert is derived from the fabric's configuration. Additionally, the image on the sheeting may correspond to an image cut from the fabric. When a fabric type insert is placed in contact with the exposed back side of the cube-corner elements 30 and the arrangement is subjected to elevated temperature and/or pressure, the resulting cube-corner sheeting bears an overall image that is capable of glittering and that exhibits the configuration or texture of the fabric. Further, the fabric's texture or weave can enhance the glittering effect in the imaged area. Coarse fabrics tend to encourage more glittering. If desired, the lower release paper 76 in FIG. 8 may be removed completely, and the pattern or image of the lower, unheated surface 74 of the beat laminating machine may be transferred to the sheeting in a glittering pattern.

There is broad latitude in producing images by contacting the ordered cube-corner sheeting with an image forming element. The appearance of the image depends on process conditions, the construction from which the imaged glittering sheeting is made, and on the size, shape, and materials of the image forming elements. The degree of glittering in imaged and in nonimaged areas may be successfully altered when one or more of these variables is changed. When the image forming element 104 is, for example, a textured surface such as fabric—such as a woven polyester mesh—the glittering effect may be considerably enhanced when compared with the glittering sheeting prepared in the absence of such a textured surface. Photomicrographs of sheeting with enhanced glittering showed a substantially greater degree of cube-corner element reorientation, including groups of cube-corner elements piled upon each other, than sheeting formed in the absence of a textured image forming element. It is believed that the enhanced glittering effect is related to the additional reflective paths available to light incident on the piled cube-corner elements. Accordingly, there is a general range of glittering image forming abilities of the article of the invention which can be achieved by changing these or other variables.

Glittering sheetings capable of bearing images also may be prepared by the second technique, directly from a mold. Essentially any method used to prepare sheetings that display glittering images on glittering or a non-glittering background or non-glittering images on a glittering background according to the first technique (FIG. 8) is also applicable to the second technique (FIG. 11). A glittering sheeting that displays an image may be used as a pattern on which mold materials are deposited and/or cured. Removal of the patterned sheeting reveals a newly formed mold that bears the image formed on the pattern material. Use of such molds produces sheeting that is capable of glittering and still contains the image applied to the original sheeting from which the mold was prepared. Images printed, deposited, or formed directly on the exposed back side of the cube-corner elements by various techniques may be faithfully replicated in the mold making process. Images placed on the body layer 58 may also end up being replicated in the mold making process.

For some applications, particularly when producing a glittering article according to the first technique (that is, using heat and/or pressure), the polymeric materials that are employed in the cube-corner elements preferably are hard and rigid. The polymeric materials may be, for example, thermoplastic or crosslinkable resins. The elastic modulus of such polymers preferably is greater than about $10 \times 10^8$ Pascals, and more preferably is greater than about $13 \times 10^8$ Pascals.

Examples of thermoplastic polymers that may be used in the cube-corner elements include acrylic polymers such as poly(methyl methacrylate); polycarbonates; cellulosics such as cellulose acetate, cellulose (acetate-co-butyrate), cellulose nitrate; epoxies; polyurethanes; polyesters such as poly(butylene terephthalate), poly(ethylene terephthalate); fluoropolymers such as poly(chlorofluoroethylene), poly(vinylidene fluororide); polyvinyl halides such as poly(vinyl chloride) or poly(vinylidene chloride); polyamides such as poly(caprolactam), poly(amino caproic acid), poly(hexamethylene diamine-co-adipic acid), poly(amide-co-imide), and poly(ester-co-imide); polyetherketones; poly(etherimide); polyolefins such as poly(methylpentene); poly(phenylene ether); poly(phenylene sulfide); poly(styrene) and poly(styrene) copolymers such as poly(styrene-co-acrylonitrile), poly(styrene-co-acrylonitrile-co-butadiene); polysulfone; silicone modified polymers (i.e., polymers that contain a small weight percent (less than 10 weight percent) of silicone) such as silicone polyamide and silicone polycarbonate; fluorine modified polymers such as perfluoropoly(ethyleneterephthalate); and mixtures of the above polymers such as a poly(ester) and poly(carbonate) blend, and a fluoropolymer and acrylic polymer blend.

The cube-corner elements also may be made from reactive resin systems that are capable of being crosslinked by a free radical polymerization mechanism by exposure to actinic radiation. Additionally, these materials may be polymerized by thermal means using a thermal initiator such as benzoyl peroxide. Radiation-initiated cationically polymerizable resins also may be used.

Reactive resins suitable for forming the cube-corner elements may be blends of a photoiniator and at least one compound bearing an acrylate group. Preferably the resin blend contains a difunctional or polyfunctional compound to ensure formation of a crosslinked polymeric network when irradiated.

Examples of resins that are capable of being polymerized by a free radical mechanism include: acrylic-based resins derived from epoxies, polyesters, polyetliers, and urethanes; ethylenically unsaturated compounds; aminoplast derivatives having at least one pendant acrylate group; isocyanate derivatives having at least one pendant acrylate group; epoxy resins other than acrylated epoxies; and mixtures and combinations thereof. The term acrylate is used here to encompass both acrylates and methacrylates. U.S. Pat. No. 4,576,850 to Martens discloses examples of crosslinked resins that may be used in the cube-corner elements of glittering retroreflective sheeting.

Ethylenically unsaturated resins include both monomeric and polymeric compounds that contain atoms of carbon, hydrogen and oxygen, and optionally nitrogen, sulfur and the halogens. Oxygen or nitrogen atoms or both are generally present in ether, ester, urethane, amide and urea groups. Ethylenically unsaturated compounds preferably have a molecular weight of less than about 4,000 and preferably are esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like.

Some examples of compounds having an acrylic or methacrylic group are listed below. The listed compounds are illustrative and not limiting.

(1) Monofinctional compounds:
ethylacrylate, n-butylacrylate, isobutylacrylate, 2-ethylhexylacrylate, n-hexylacrylate, n-octylacrylate, isooctylacrylate, isobornyl acrylate, tetrahydrofurfuryl acrylate, 2-phenoxyethyl acrylate, N,N-dimethylacrylamide;

(2) Difunctional compounds:
1,4-butanediol diacrylate, 1,6-hexanediol diacrylate, neopentylglycol diacrylate, ethylene glycol diacrylate, triethyleneglycol diacrylate, and tetraethylene glycol diacrylate, and diethylene glycol diacrylate;

(3) Polyfunctional compounds:
trimethylolpropane triacrylate, glyceroltriacrylate, pentaerythritol triacrylate, pentaerythritol tetraacrylate, and tris(2-acryloyloxyethyl)isocyanurate.

Some representative examples of other ethylenically unsaturated compounds and resins include styrene, divinylbenzene, vinyl toluene, N-vinyl pyrrolidone, N-vinyl caprolactam, monoallyl, polyallyl, and polymethallyl esters such as diallyl phtbalate and diallyl adipate, and amides of carboxylic acids such as and N,N-diallyladipamide.

Examples of photopolymerization initiators that may be blended with the acrylic compounds include the following illustrative initiators: benzyl, methyl o-benzoate, benzoin, benzoin ethyl ether, benzoin isopropyl ether, benzoin isobutyl ether, etc., benzophenone/tertiary amine, acetophenones such as 2,2-diethoxyacetophenone, benzyl methyl ketal, 1-hydroxycyclohexyl phenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, (2,4,6-trimethylbenzoyl) diphenylphosphine oxide, 2-methyl-1-4-(methylthio) phenyl-2-morpholino-1-propanone, bis(2,6-dimethoxybenzoyl)-2,4,4-trimethylpentylphosphine oxide, et cetera. These compounds may be used individually or in combination.

Cationically polymerizable materials include but are not limited to materials containing epoxy and vinyl ether functional groups. These systems are photoinitiated by onium salt initiators such as triarylsulfonium, and diaryliodonium salts.

Preferred polymers for use in the cube-corner elements include poly(carbonate), poly(methylmethacrylate), poly (ethylene terephthalate), aliphatic polyuretlianes and crosslinked acrylates such as multi-functional acrylates or acrylated epoxies, acrylated polyesters, and acrylated urethanes blended with mono- and multi-functional monomers. These polymers are preferred for one or more of the following reasons: thermal stability, environmental stability, clarity, release from the tooling or mold, or high receptivity for receiving a reflective coating.

The polymeric materials employed in a land layer, if one is present, may be the same as the polymers that are employed in the cube-corner elements. The optional land layer preferably has a smooth interface with the cubes and the body layer. When present, the land layer, in most instances, is integral with the cube-corner elements. By "integral" is meant the land and cubes are formed from a single polymeric material—not two different polymeric layers subsequently united together. Although the land layer desirably is made of a polymer similar to that of the cubes, the land layer also may be made from a softer polymer such as those described above for use in the body layer.

The body layer may comprise a low elastic modulus polymer for easy bending, curling, flexing, conforming, or stretching, and for allowing the cube-corner elements to become reoriented when an ordered array is exposed to heat and pressure. The elastic modulus may be less than $5 \times 10^8$ Pascals, and may also be less than $3 \times 10^8$ Pascals. A low elastic modulus body layer, however, is not always required. If it is desired to make glittering sheetings that are less flexible, sheetings with body layer having higher elastic modulus may be used, such as rigid vinyl with elastic modulus about 21 to $34 \times 10^8$ Pa. Generally, the polymers of the body layer have a glass transition temperature that is less than 50° C. The polymer preferably is such that the polymeric material retains its physical integrity under the conditions to which it is exposed during processing. The polymer desirably has a Vicat softening temperature that is greater than 50° C. The body layer may be either a single layer or a multi-layer component as desired. Examples of polymers that may be employed in the body layer include:

fluorinated polymers such as: poly (chlorotrifluoroethylene), for example Kel-F800™ available from 3M St. Paul, Minn.; poly (tetrafluoroethylene-co-hexafluoropropylene), for example Exac FEPT™ available from Norton Performance, Brampton, Mass.; poly (tetrafluoroethylene-co-perfluoro(alkyl)vinylether), for example, Exac PEA™ also available from Norton Performance; and poly(vinylidene fluoride-co-hexafluoropropylene), for example, Kynar Flex-2800™ available from Pennwalt Corporation, Philadelphia, Pa.;

ionomeric ethylene copolymers such as: poly(ethylene-co-methacrylic acid) with sodium or zinc ions such as Surlyn-8920™ and Surlyn-9910™ available from E.I. dupont Nemours, Wilmington, Del.;

low density polyethylenes such as: low density polyethylene; linear low density polyethylene; and very low density polyethylene;

plasticized vinyl halide polymers such as plasticized poly(vinyl chloride);

non- or unplasticized rigid vinyl polymers such as Pentaprint™ PR 180 from Klockner Pentaplast of America, Inc., Gordonsville, Va.;

polyethylene copolymers including: acid functional polymers such as poly(ethylene-co-acrylic acid) and poly (ethylene-co-methacrylic acid) poly(ethylene-co-maleic acid), and poly(ethylene-co-fumaric acid); acrylic functional polymers such as poly(ethylene-co-alkylacrylates) where the alkyl group is methyl, ethyl, propyl, butyl, et cetera, or $CH_3(CH_2)n$—where n is 0–12, and poly(ethylene-co-vinylacetate); and aliphatic and aromatic polyurethanes derived from the following monomers (1)–(3): (1) diisocyanates such as dicyclohexylmethane-4,4'-diisocyanate, isophorone diisocyanate, 1,6-hexamethylene diisocyanate, cyclohexyl diisocyanate, diphenylmethane diisocyanate, and combinations of these diisocyanates, (2) polydiols such as polypentyleneadipate glycol, polytetramethylene ether glycol, polyethylene glycol, polycaprolactone diol, poly-1,2-butylene oxide glycol, and combinations of these polydiols, and (3) chain extenders such as butanediol or hexanediol. Commercially available urethane polymers include: PN-04, or 3429 from Morton International Inc., Seabrook, N.H., or X4107 from B.F. Goodrich Company, Cleveland, Ohio.

Combinations of the above polymers also may be employed in the body layer of the body portion. Preferred polymers for the body layer include: the ethylene copolymers that contain units that contain carboxyl groups or esters of carboxylic acids such as poly(ethylene-co-acrylic acid), poly(ethylene-co-methacrylic acid), poly(ethylene-co-vinylacetate); the ionomeric ethylene copolymers; plasticized poly(vinyl chloride); and the aliphatic urethanes. These polymers are preferred for one or more of the following reasons: suitable mechanical properties, good adhesion to the land layer or cube-corner elements, clarity, and environmental stability.

Selection of certain resins for the cube-corner elements and the body layer may result in an interpenetrating network after curing. Particular combinations of resins for cube-corner elements and body layer can be readily screened for penetration by application of a quantity of the cube-corner resin to the body layer. Priola, A., Gozzelino, G., and Ferrero, F., *Proceedings of the XIII International Conference in Organic Coatings Science and Technology*, Athens, Greece, Jul. 7–11, 1987, pp. 308–18, discloses a watch glass test suitable for this purpose. See also U.S. Pat. No. 5,691,846.

In an embodiment that contains polycarbonate cube-corner elements and/or a polycarbonate land layer and a body layer that contains a polyethylene copolymer such as poly(ethylene-co-(meth)acrylic acid), poly(ethylene-co-vinylacetate) or poly(ethylene-co-acrylate), the interfacial adhesion between the body layer and the land layer or cube-corner elements can be improved by placing a thin tie-layer (not shown) therebetween. The tie-layer can be applied on the body layer before laminating the body layer to the land layer or to the cube-corner elements. The tie-layer can be applied as a thin coating using, for example: an aliphatic polyurethane in organic solution, for example Permuthane™ U26-248 solution, available from Permuthane Company, Peabody, Mass.; Q-thane™ QC-4820 available from K. J. Quinn and Co., Inc., Seabrook, N.H.; an aliphatic polyurethane waterborne dispersion, for example NeoRez™ R-940, R-9409, R-960, R-962, R-967, and R-972, available from ICI Resins US, Wimington, Mass.; an acrylic polymer water borne dispersion, for example, NeoCrylm A-601, A-612, A614, A-621, and A-6092, available from ICI Resins US, Wilmington, Mass.; or an alkyl acrylate and aliphatic urethane copolymer water borne dispersion, for example NeoPac™ R-9000, available from ICI Resins US, Wilmington, Mass. In addition, an electrical discharge method, such as a corona or plasma treatment, can be used to further improve the adhesion of tie-layer to the body layer or the tie-layer to the land layer or to the cube-corner elements.

Cube-corner sheetings that are produced according to the second technique may be made from polymers discussed above as being applicable in the first technique. That is, the cube-corner elements may comprise harder, or high modulus polymer(s) and the body portion may comprise softer, or lower modulus polymer(s). In addition to these materials, cube-corner sheetings that comprise harder body layer polymers such as polyesters or polycarbonates may also be made by the second technique. Further, when sheeting is made by the second technique the chemistry applicable to the cube-corner elements is broader than in the first technique, that is, cube-corner elements may comprise either hard or soft polymers. U.S. patent application Ser. No. 08/747,105 which is a continuation-in-part of Ser. No. 08/625,857 to Wilson et al. (filed Apr. 1, 1996, now abandoned) discloses examples of polymers that may be used in the cube-corner elements of the present invention.

When an article of the invention is prepared according to the second technique, soft polymers—that is, polymers having an elastic modulus less than $10 \times 10^8$ Pascals—may be used to produce the cube-corner elements in glittering sheeting. In the second technique, the cube-corner elements are not subjected to the heat and/or pressure conditions of the batchwise or continuous processes of the first technique because the cube-corner element orientations are determined by the configuration of the mold. That is, glittering sheetings made by the second technique can produce cube-corner element orientations of the invention directly from the mold. Distortion of the cube-corner elements therefore is much less a concern, and it is possible to produce glittering sheetings that comprise only, or consist essentially of, soft polymers throughout the construction.

Example of soft polymers that can be used to make glittering cube-corner sheeting using the second technique include flexible poly(vinyl halides) such as poly(vinyl chloride), poly(vinylidene chloride); PVC-ABS; reactive and nonreactive vinyl resins; vinyl acrylates; mixtures of vinyl acrylates with acrylated epoxies; polysiloxanes; alkylalkoxysilanes; acrylated polysiloxanes; polyurethanes; acrylated urethanes; polyesters; acrylated polyesters; polyethers; acrylated polyethers; acrylated oils; poly (tetrafluoroethylene); poly(fluoroethylene-co-fluoropropylene); poly(ethylene-co-tetrafluoroethylene); polybutylene; polybutadiene; poly(methylpentene); polyethylenes such as low density, high density, and linear low density; poly(ethylene-co-vinyl acetate); poly(ethylene-co-ethyl acrylate).

These polymers can be used either alone or may be blended together. Further, they can be blended with those described for the first technique to give glittering cube-corner retroreflective sheeting via the second technique. In addition, adjusting the crosslink density of the reactive polymers or blends listed for the first technique can also yield soft materials. The properties of the nonreactive polymers can be adjusted by changing the concentration of additives such as plasticizer, or by selection of different polymer grades.

Colorants, UV absorbers, light stabilizers, free radical scavengers or antioxidants, processing aids such as antiblocking agents, releasing agents, lubricants, and other additives may be added to the body portion or cube-corner elements. The particular colorant selected, of course, depends on the desired color of the sheeting. Colorants typically are added at about 0.01 to 1 weight percent. UV absorbers typically are added at about 0.5 to 2.0 weight percent. Examples of UV absorbers include derivatives of benzotriazole such as Tinuvin™ 327, 328, 900, 1130, Tinuvin-P™, available from Ciba-Geigy Corporation, Ardsley, N.Y.; chemical derivatives of benzophenone such as Uvinul™-M40, 408, D-50, available from BASF Corporation, Clifton, N.J., or Cyasorb™ UV531 from Cytech Industries, West Patterson, N.J.; Syntase™ 230, 800, 1200 available from Neville-Synthese Organics, Inc., Pittsburgh, Pa.; or chemical derivatives of diphenylacrylate such as Uvinul™-N35, 539, also available from BASF Corporation of Clifton, N.J. Light stabilizers that may be used include hindered amines, which are typically used at about 0.5 to 2.0 weight percent. Examples of hindered amine light stabilizers include Tinuvin™-144, 292, 622, 770, and Chimassorb™-944 all available from the Ciba-Geigy Corp., Ardsley, N.Y. Free radical scavengers or antioxidants may be used, typically, at about 0.01 to 0.5 weight percent. Suitable antioxidants include hindered phenolic resins such as Irganox™-1010, 1076, 1035, or MD-1024, or Irgafos™-168, available from the Ciba-Geigy Corp., Ardsley, N.Y. Small amount of other processing aids, typically no more than one weight percent of the polymer resins, may be added to improve the resin's processibility. Useful processing aids include fatty acid esters, or fatty acid amides available from Glyco Inc., Norwalk Conn., metallic stearates available from Henkel Corp., Hoboken, N. J., or Wax E™ available from Hoechst Celanese Corporation, Somerville, N.J. Flame retardants—such as Tetrabromo Bisphenol A Diacrylate Monomer, SR 640, from Sauromer Company, Inc., Exton, Pa., or Tricresyl phosphate, Kronitex™ TCP, from FMC Corporation, Philadelphia, Pa.—also may be added to the polymeric materials of the inventive sheeting to optimize its overall properties, as well as the properties of the article to which it may be attached.

Flexible glittering sheeting may be used on or as irregular surfaces as decorative articles. For example, the sheeting may be placed on or used as small decorative items such as: ribbons, bows, shred, tinsel; wrapping and packaging items such as tissue, bags, wrapping paper; greeting cards; ornaments; home decorations such as wall coverings and window decorations; fabric; decorations or ornamentations for toys; or may be a conspicuity article for use on a sidewall of truck trailer, a flexible article of clothing, a warning flag, a light wands, et cetera. Sheetings of the invention also may be embossed or otherwise adapted into three dimensional structures as taught in U.S. patent application Ser. No. 08/641,126 entitled "Formed Ultra-Flexible Retroreflective Cube-Corner Composite Sheeting with Target Optical Properties and Method for Making Same" (attorney docket number 52477USA3A) filed on the same day as this patent application.

The invention is further illustrated in detail by the following Examples. While the Examples serve this purpose, it should be understood that the particular ingredients used as well as other conditions and details are not to be construed in a manner that would unduly limit the invention.

EXAMPLES

Example 1

Glittering, Nonretroreflective Sheeting from Electroformed Tool

Glittering cube-corner retroreflective sheeting—prepared as described in Example 1h of U.S. patent application Ser. No. 08/640,326—entitled "Glittering Cube-Corner Retroreflective Sheeting" (attorney docket number 52373USA3A) filed on the same day as this application—was positioned on a backing support and fixed in place with double-sided adhesive tape. A silver metal coating was provided over the entire surface by electroless deposition for rendering the glittering cube-corner retroreflecting sheeting conductive for electroplating. The resulting assembly was immersed in a nickel sulfamate bath containing 16 ounces/gallon (120 g/L) of nickel; 0.5 ounces/gallon (3.7 g/L) of nickel bromide; and 4.0 ounces/gallon (30 g/L) of boric acid. The remainder of the plating bath was filled with distilled water. A quantity of S-nickel anode pellets were contained within a titanium basket that was suspended in the plating bath. A woven polypropylene bag was provided surrounding the titanium basket within the plating bath for trapping particulates. The plating bath was continuously filtered through a 5 micrometer filter. The temperature of the bath was maintained at 90° F.(32° C.) and a pH of 4.0 was maintained in the plating bath solution. A current density of 20 amps per square foot (215 amp/square meter) was applied to the system for 24 hours with the mounted sheeting continuously rotated at 6 rpm to enhance uniformity of deposition. Upon removal from the electroforming bath, the cube-corner sheeting capable of exhibiting the glittering effect was removed from the electrodeposited metal to give a nickel mold, approximately 0.025 inches (approximately 0.063 cm) thick, which was the negative image of the original glittering cube-corner sheeting. The mold alone displayed the properties of glittering, although it did not exhibit the rainbow hues of which the sheeting was capable.

A mixture of 54.2 parts by weight of LSR-9151-200P liquid silicone rubber Par A and 5.4 parts by weight of LSR-91951-200P Part B (both parts A and B available from Dow Corning, Midland, Mich.) was stirred thoroughly and then degassed by subjecting to vacuum at room temperature for 15 minutes. The resulting mixture was applied to the mold described above and allowed to fill all the cavities. The filled tool was heated at 370° F. for 10 minutes then allowed to cool to room temperature. Removal of the cured sheeting from the mold gave an opaque, white sheeting that was capable of fine glittering from the back side of the sheeting and was not retroreflective.

Example 2

An electroformed tool prepared according to Example 1 was used. A mixture of 32.7 g of SX 863 magenta plastisol screen printing ink (Plasto-O-Meric, Sussex, Wis.) and 13.6 g of Di-isononylphthalate Exxon Chemical Company, Houston, Tex.) was thoroughly mixed, then poured into the mold. The filled mold was heated at 390° F. for 15 minutes, then cooled to room temperature. Removal of the sheeting from the mold gave a dark magenta colored glittering sheeting that was not retroreflective and glittered.

Example 3

An electroformed tool prepared according to Example 1 was used. A mixture of 36.7 g of SX 863 magenta plastisol screen printing ink and 30.5 g of M2112 heat sealing plastisol Roth available from Plasto-O-Meric, Sussex, Wis.) was thoroughly mixed, then poured into the mold. The filled mold was heated on a hot plate set to low temperature for 2 minutes, then heated at 370° F. for 10 minutes, and then cooled to room temperature. Removal of the sheeting from the mold gave a light magenta colored glittering sheeting that was not retroreflective and glittered from both sides of the sheeting. The glittering from light transmitted through the sheeting was red in color and the glittering from the back side of the sheeting was white.

Example 4

An electroformed tool prepared according to Example 1 was used. A mixture of 32.7 g of SX 863 magenta plastisol screen printing ink, 12.1 g of SX 863 Cyan colored screen printing plastisol, and 41.6 g of M2112 heat sealing plastisol (all three available from Plasto-O-Meric, Sussex, Wis.) was thoroughly mixed, then poured into the mold. The filled mold was heated on a hot plate set to low temperature for 2 minutes, then heated at 370° F. for 10 minutes, and then cooled to room temperature. Removal of the sheeting from the mold gave a green colored glittering sheeting that was not retroreflective and exhibited the glittering effect from both sides of the sheeting. The glittering from light transmitted through the sheeting was green in color and the glittering from the back side of the sheeting was white.

All of the patents and patent applications cited above are wholly incorporated by reference into this patent application.

As illustrated by the above discussion, the invention may take on various modifications and alterations without departing from its total scope and spirit. Accordingly, the invention is not limited to the above-described but is to be controlled by the limitations set forth in the claims and any equivalents thereof

What is claimed is:

1. A non-retroreflective glittering sheeting that comprises an array of cube-corner elements that are arranged in the array to make the sheeting glitter when light is incident thereon, whereby a multiplicity of discrete regions appear as distinct points of light to an observer of the sheeting.

2. The sheeting of claim 1, wherein the array of cube-corner elements is defined by three sets of intersecting grooves, wherein each groove set includes two or more generally parallel grooves, and at least one groove in at least one of the sets has faces of adjacent cube-corner elements arranged such that a dihedral angle α located between the adjacent faces varies along the groove(s) in the set.

3. The sheeting of claim 2, wherein at least one groove in each of the three sets of intersecting grooves has faces of adjacent cube-corner elements arranged such that the dihedral angle α located between the adjacent faces varies along the grooves in all three groove sets.

4. The sheeting of claim 3, wherein the cube-corner elements are about 20 to 200 micrometers high and exhibit a variation in height between adjacent apexes of 1 to 40 micrometers on average.

5. The sheeting of claim 2, wherein angle α varies from 0 degrees to 180 degrees.

6. The sheeting of claim 5, wherein angle α ranges from 35 to 115 degrees on average.

7. The sheeting of claim 1, wherein the cube-corner elements each include a base plane and the cube-corner elements are arranged such that the base planes do not all reside in the same general plane when the sheeting is laid flat.

8. The sheeting of claim 1, wherein the cube-corner elements are randomly-tilted across at least a portion of the array.

9. The sheeting of claim 1, wherein the cube-corner elements have base edges that do not lie in the same common plane when the sheeting is laid flat.

10. The sheeting of claim 1, which contains a glittering image on a non-glittering background.

11. The sheeting of claim 1, which contains a glittering image on a glittering background.

12. The sheeting of claim 1, which contains a non-glittering image on a glittering background.

13. The sheeting of claim 1, wherein the glitter produces at least about 10 points of light per square centimeter.

14. The sheeting of claim 1, wherein the glitter produces at least about 50 points of light per square centimeter.

15. The sheeting of claim 14 comprising less than about 250 points of light per square centimeter.

16. The sheeting of claim 1, wherein the array of cube-corner elements projects from a body portion, and wherein the cube-corner elements, the body portion, or both are opaque.

17. The sheeting of claim 16, wherein opacity is provided by fillers, opaque pigments, or flakes.

18. The sheeting of claim 1, wherein the array of cube-corner elements project from a body portion that has a front surface, and wherein the sheeting is rendered non-retroreflective by having the front surface juxtaposed against an opaque surface.

19. The sheeting of claim 1, rendered non-retroreflective by coating the cube-corner elements' back side.

20. A non-retroreflective glittering article that comprises:

(a) a base surface; and (b) a structured surface opposite the base surface, the structured surface comprising an array of cube-corner elements, which array is defined by three sets of intersecting grooves, wherein each groove set includes two or more generally parallel grooves, and at least one groove in at least one of the sets has faces of adjacent cube-corner elements arranged such that a dihedral angle located between the adjacent faces varies along the at least one groove.

21. A glittering non-retroreflective sheeting that comprises:

a structured surface that includes a multiplicity of discrete cube-corner elements, the cube-corner elements each including a base surface and three faces, the cube-corner elements being arranged such that the base surfaces do not reside in the same plane when the sheeting is laid flat.

22. A glittering non-retroreflective article that comprises:

(a) a base surface; and (b) a structured surface opposite the base surface, wherein the structured surface comprises an array of randomly-tilted cube-corner elements.

* * * * *

UNITED STATES PATENT AND TRADEMARK OFFICE
CERTIFICATE OF CORRECTION

PATENT NO.    : 5,948,488
DATED         : September 7, 1999
INVENTOR(S)   : Marecki, Paul E.

It is certified that error appears in the above-identified patent and that said Letters Patent is hereby corrected as shown below:

Column 4,
Line 61, delete "comer" and insert in place therefor -- corner --.
Line 63, delete "comer," and insert in place therefor -- corner, --.

Column 7,
Line 36, delete "5,691,846" and insert in place thereof -- 5,614,286 --.
Line 36, delete "patentapplication Ser." and insert in place thereof -- Pat. --.

Column 12,
Line 58, delete "fiexographic" and insert in place thereof -- flexographic --.

Column 13,
Line 32, delete "beat" and insert in place thereof -- heat --.

Column 14,
Line 56, delete "polyetliers," and insert in place thereof  -- polyethers, --.

Column 15,
Line 13, delete "Monofinctional" and insert in place thereof -- Monofunctional --.
Line 33, delete "phtbalate" and insert in place thereof -- phthalate --.
Line 57, delete "polyuretlianes" and insert in place thereof -- polyurethanes --.

Column 16,
Line 33, delete "Exac FEPT$^{TM}$" and insert in place thereof -- Exac FEP$^{TM}$ --.

UNITED STATES PATENT AND TRADEMARK OFFICE
CERTIFICATE OF CORRECTION

PATENT NO. : 5,948,488
DATED : September 7, 1999
INVENTOR(S) : Marecki, Paul E.

It is certified that error appears in the above-identified patent and that said Letters Patent is hereby corrected as shown below:

Column 17,
Line 49-50, delete "Neo Crylm" and insert in place thereof -- NeoCryl$^{TM}$ --.

Column 20,
Line 46, delete "Roth" and insert in place thereof -- (both --.

Signed and Sealed this

Eleventh Day of February, 2003

JAMES E. ROGAN
*Director of the United States Patent and Trademark Office*